Oct. 31, 1967 W. T. DOWNS 3,349,877
POWER TRANSMISSION MECHANISM
Filed Aug. 12, 1963
3 Sheets-Sheet 1
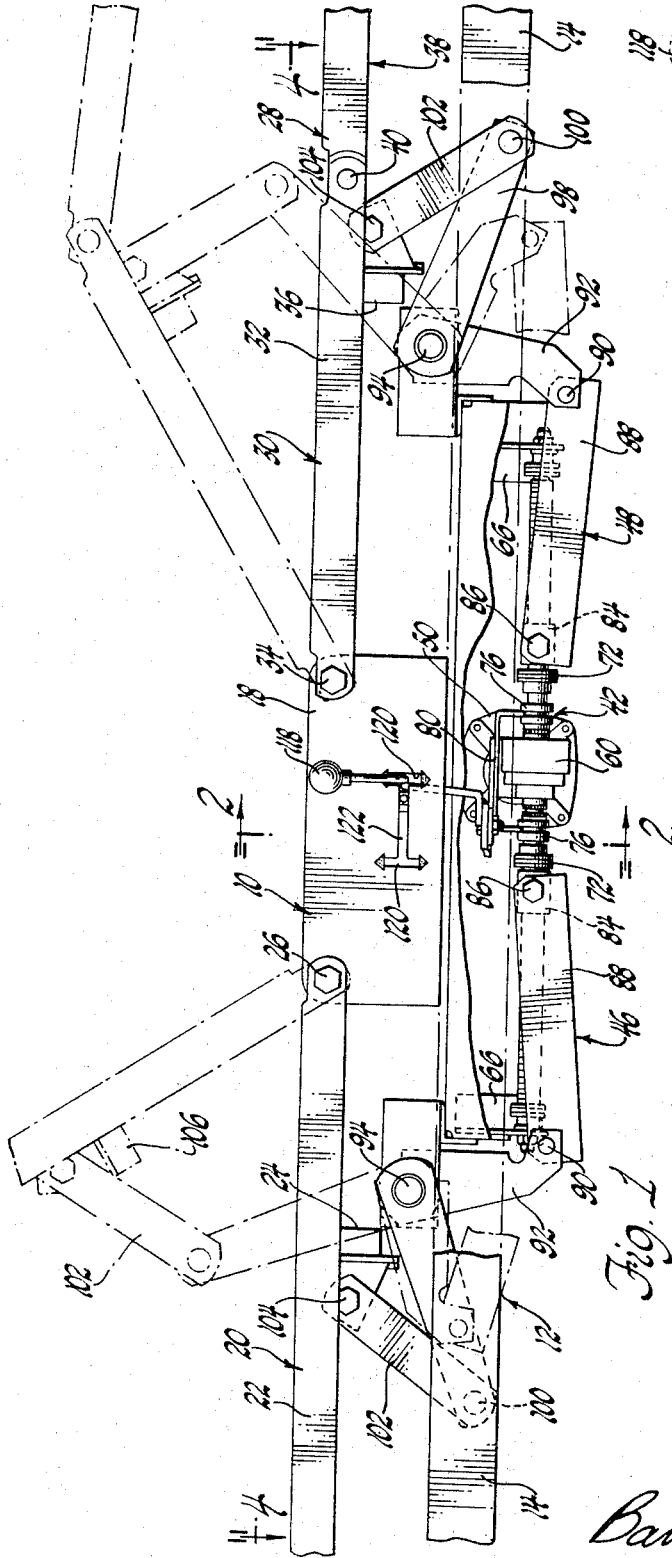
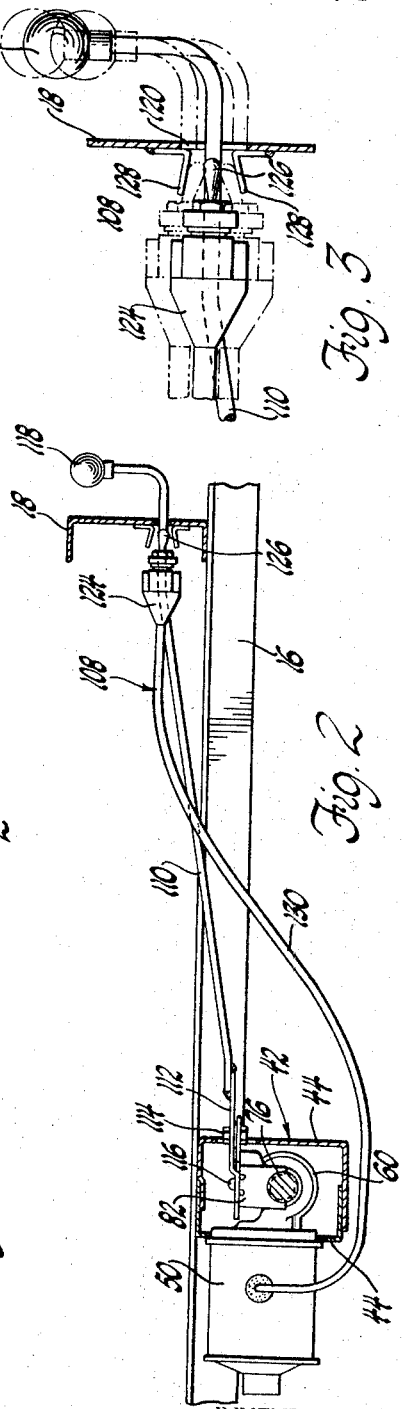
INVENTOR.
William T. Downs
BY
Barnard, McGlynn & Reising
ATTORNEYS

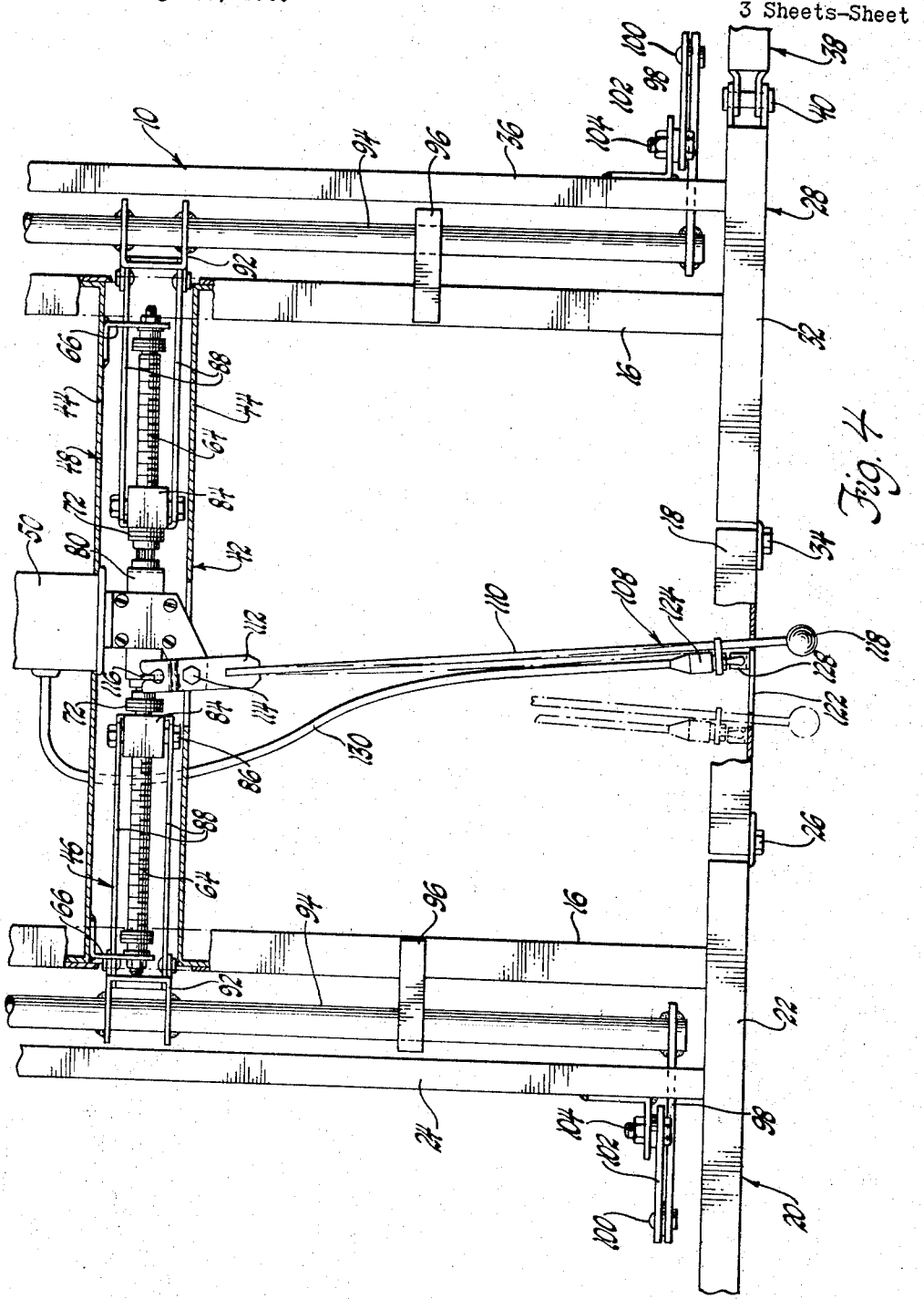

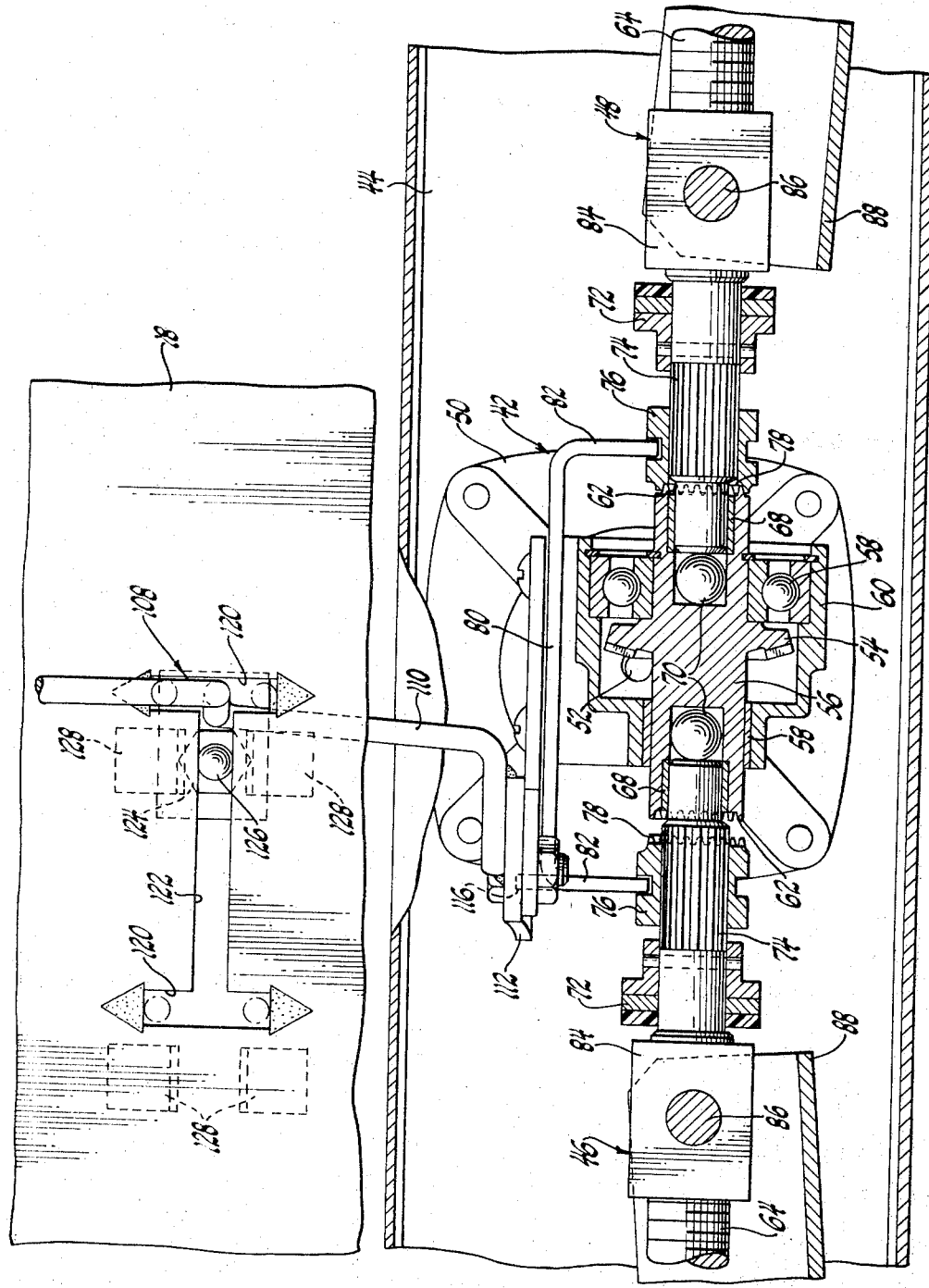

3,349,877
POWER TRANSMISSION MECHANISM
William T. Downs, Detroit, Mich., assignor, by mesne assignments, to Lear Siegler, Inc., Santa Monica, Calif., a corporation of Delaware
Filed Aug. 12, 1963, Ser. No. 301,433
13 Claims. (Cl. 192—.02)

This invention relates to an adjustable bed construction and the like of the type typically employed in hospitals, convalescent homes and the like and, in particular, to such a bed construction comprising an improved power transmission mechanism for controlling adjustment of the adjustable frame members thereof.

Adjustable bed constructions of the type to which the present invention particularly pertains typically comprise a longitudinally extending main frame, first and second auxiliary frames respectively overlying longitudinally spaced portions of the main frame and adapted to adjustably support upper and lower portions of the human torso, means respectively pivotally mounting adjacent ends of the auxiliary frames about longitudinally spaced axes extending transversely of the main frame for pivotal movement between raised and lowered positions relative to the latter, and independent adjusting mechanisms, each commonly including a hand crank, for independently controlling adjustment of the position of the auxiliary frames relative to each other and the main frame. As will be readily apparent to those who have been hospitalized or required to convalesce in such a bed at home, adjustment of the relative angular relationships of the auxiliary frames of the bed more often than not requires summoning a nurse or other person to operate the adjusting mechanisms aforementioned. Entirely apart from the fact that operation of the bed in this manner requires the efforts of another person, it too often happens that someone is not readily available to perform the required adjustment of the bed thereby contributing to the discomfort of the occupant thereof.

It is, therefore, a principal object and feature of this invention to provide an adjustable bed construction or the like of the type referred to above comprising power-actuated drive means operatively connectable to the respective adjustable auxiliary frame sections thereof, and adapted to be controlled entirely by the occupant of the bed.

More specifically, it is yet another object and feature of this invention to provide an adjustable bed construction or the like comprising a main frame, first and second auxiliary frames pivotally mounted on the main frame for adjustable movement between raised and lowered positions relative thereto, power-actuated drive means including a power-actuated drive member, first and second drive members operatively connected respectively to the aforementioned first and second auxiliary frames to be adjusted, clutch means operable to selectively alternately clutchingly engage the drive means and drive member to one or the other of the aforementioned driven members to perform the desired adjustment, such clutch means having a neutral position, a first shifted position clutchingly engaging the driving member with the first driven member and a second shifted position clutchingly engaging the driving member with the second driven member to selectively power adjust the respective auxiliary frames, and manually operable control means controlling selective shifting movement of the aforementioned clutch means between such positions thereof to selectively transmit drive to the respective frame members for adjustment thereof independently of each other.

In this regard, and in its more particular aspects, it is yet another object and feature of the present invention to provide a bed construction or the like in which the aforementioned manually operable control means includes means for simultaneously energizing and de-energizing the aforementioned power-actuated means during shifting of the clutch means, whereby, with the control means in a neutral position, the power actuated means is de-energized but, upon movement of the clutch means to either of its clutching positions aforementioned, the power actuated means is energized as a concomitant to such shifting movement.

Referring to yet another and more specific aspect of the invention, the latter is particularly characterized by the fact that the aforementioned control means includes a yieldable or flexible control lever or rod pivotally mounted for movement relative to the main frame and having one position thereof operatively connected to the aforementioned clutch means to control shifting movement of the latter, the other end thereof adapted to be manually grasped by the occupant of the bed and disposed in either one of two detent positions, to either side of a neutral position, in which the clutch means is engaged to power adjust one or the other of the auxiliary frames as the case may be. Furthermore, upon shifting of the control rod as aforementioned, if the interengageable clutch elements of the clutch mechanism should not mesh as may often be the case, the relative relationship between the aforementioned detents and the connection of the control rod to the clutch means is such as to stress the rod which thereby imposes a biasing action on the clutch elements of the clutch mechanism whereby they readily engage upon initial operation of the power actuated drive means aforementioned.

More specifically, it is preferred that the power actuated drive means include a reversible electric motor, the construction further comprising switch means carried by such rod or lever aforementioned and movable in unison therewith, and switch actuating means respectively adjacent each of the aforementioned detent means for selectively engaging and operating the switch means to energize the motor means in opposite directions in response to selective manipulation of the control rod or lever in opposite directions within the confine of the respective detent means.

The invention further includes among its objects the provision of an improved power transmission mechanism of the type aforementioned characterized by control means to substantially concurrently energize a power actuated drive means upon shifting a clutch means to a position to drivingly couple such drive means to a member to be driven, such control means acting to bias the clutch means into coupled engagement if not initially so coupled.

These and other objects, features and advantages of the invention will appear more fully hereinafter as the description thereof proceeds, reference being made to the accompanying drawings in which:

FIGURE 1 is a fragmentary side elevational view of an adjustable bed construction illustrating a preferred embodiment of the invention, the adjustable auxiliary frame members of the construction and their associated linkage being shown in an extreme lowered position in a solid line and in a raised position in phantom line;

FIGURE 2 is a fragmentary sectional view taken along line 2—2 of FIGURE 1;

FIGURE 3 is an enlarged fragmentary view of FIGURE 2 illustrating certain details thereof;

FIGURE 4 is a view taken generally along line 4—4 of FIGURE 1; and

FIGURE 5 is an enlarged fragmentary view of FIGURE 1, partially broken away and in section, illustrating certain details of the power drive transmission mechanism associated with the bed construction.

Referring now to the drawings, and particularly FIGURES 1 and 4 thereof, the numeral 10 generally indicates an adjustable bed construction comprising the usual main frame 12 which includes the usual laterally spaced longitudinally extending side rails 14 and a suitable number of longitudinally spaced laterally extending cross frame members 16 interconnecting such side rails. A frame member 18, only one of which is shown, upstands from each side rail 14 intermediate the ends of the latter and is suitably rigidly secured thereto.

A first auxiliary frame indicated generally at 20 is of usual construction in that it overlies one longitudinal portion of the main frame 12 and includes a pair of laterally spaced longitudinally extending side rails 22, only one of which is shown, suitably interconnected by one or more cross frame members 24 and mounting the usual bed spring members thereon to receive portions of a mattress. One end of each of the side rails is suitably pivotally connected as indicated at 26 to the aforementioned frame members 18 secured to the main frame for pivotal movement between lowered and raised positions, as indicated in FIGURE 1, about an axis extending laterally of the main frame. The auxiliary frame 20 is adapted to support the upper or head portion of the human torso.

A second auxiliary frame indicated generally at 28 is also of usual construction in that it comprises a first frame member 30 including laterally spaced longitudinally extending side rails 32 pivotally connected as indicated at 34 to the respective frame members 18 for pivotal raising and lowering movement about an axis extending laterally of the main frame 12 in longitudinally spaced relation from the auxiliary frame 20 and overlying another longitudinally extending portion of the main frame. One or more cross frame members 36 interconnect the side rails 32. As is conventional, the second auxiliary frame includes a second frame member 38 having one end thereof pivotally connected to the other end of the first frame member 30 on the lateral axis illustrated at 40, the other end of the second frame member 38 being adapted to ride upon the main frame side rails 14 during pivotal adjustment of the second auxiliary frame 28 in a manner well known to those acquainted with this art. As will be appreciated, the second auxiliary frame 28 is adapted to adjustably support the lower portion of the human torso the first frame member 30 being often referred to as a seat portion of the bed and the second frame member 38 being referred to as the foot portion thereof.

A power actuated drive transmission mechanism for adjustably positioning the aforementioned auxiliary frames 20 and 28 is indicated generally at 42 and, referring particularly to FIGURES 1, 4 and 5, comprises means including laterally spaced longitudinally extending panel members 44 having their opposite ends suitably rigidly secured to the respective cross frame members 16 of the main frame between the side rails of the latter to form a housing for screw and nut assemblies 46 and 48 respectively controlling adjustment of the auxiliary frames 20 and 28. A suitably reversible electric motor 50 is rigidly mounted on one of the panel members 44 and, as indicated particularly in FIGURE 5, including a geared output shaft 52 in continuous driving engagement with a drive gear 54 formed integral with or otherwise suitably secured to a drive shaft 56 suitably mounted for rotation, as by means of the bearings 58, within a housing 60 suitably fixed to the housing of motor 50. The coaxial end faces of the drive shaft 56 project beyond the housing 60, and are respectively provided with an annular series of axially facing clutch teeth 62 of conventional construction.

The screw and nut assemblies 46 and 48 are substantially identical, and each comprises a threaded rotatable screw shaft 64 having one end thereof suitably mounted for rotation in the respective brackets 66 fixed to the main frame cross frame members 16, and the other end thereof suitably piloted for rotation within the bearing means 68 disposed in the axially opposed bores in the opposite ends of the drive shaft 56, the ball members 70 being interposed between the drive shaft and the ends of the threaded screw shafts to minimize friction therebetween. A stop collar 72 is suitably provided on each of the screw shafts 64 between the threaded portion thereof and an axially splined portion 74 on which portions 74 are mounted the similarly splined clutch members or collars 76 for axially shiftable movement thereon. As will be apparent, the respective clutch members or collars 76 include an annular series of clutch teeth 78 disposed axially opposite to and adapted to meshingly clutchingly engage the aforementioned clutch teeth 62 on the respective ends of the drive shaft 56. A carriage member or bracket 80 of generally inverted U-shaped configuration is suitably mounted for shifting movement adjacent housing 60, and includes two spaced depending yoke-like legs 82 suitably mounted within a cooperating annular groove in each of the clutch collars 76 to interconnect the latter for shifting movement in unison, the carriage 80 being connected to a control mechanism to accomplish such shifting movement in a manner to be described more fully hereinafter.

Each of the screw and nut assemblies 46 and 48 further comprises a threaded nut member 84 engaged with the threaded screw shafts 64 for reciprocation therealong as the latter rotate, each nut being pivotally connected as indicated at 86 to one end of a drive link 88 having its other end pivotally connected at 90 to one end of a drive lever or levers 92, the other ends of which are suitably rigidly secured to the transversely extending torque tubes 94 suitably mounted for rotation in a suitable number of mounting brackets 96 secured to the cross frame members 16 of the main frame. The opposite ends of the torque tubes 94 are respectively suitably secured to one end of drive levers 98, the other ends of which are suitably pivotally connected at 100 to one end of the drive links 102 having the other ends pivotally connected at 104 to the cross frame members 24 and 36 of the respective auxiliary frames 20 and 28. Therefore, and as will now be apparent, as the respective nuts 84 move longitudinally away from each other from the full line positions illustrated in FIGURE 1, the various drive levers and drive links aforedescribed are driven from their full line positions to an infinite number of adjusted positions within design limits as indicated, for example, in phantom line in FIGURE 1 in which stops 106 carried by the side rails of the respective auxiliary frames 22 and 28 engage respective drive links 102.

In order to selectively control shifting movement of the aforedescribed clutch members or collars 76 to alternately drivingly couple the respective ends of the drive shaft 56 to one or the other of the screw and nut assemblies 46 and 48, control means indicated generally at 108 are provided comprising a control rod 110 having some degree of flexibility throughout its length, and having one end thereof suitable rigidly secured to a relatively inflexible control arm 112 suitably pivotally mounted adjacent carriage 80 about a substantially vertical axis as indicated at 114, and including a clevis portion at one extreme end thereof embracing a finger 116 upstanding from one end of the aforementioned carriage 80. The other end of the control rod extends through one of the frame members 18 fixed to the main frame 12, and terminate in an upstanding portion equipped with a manually graspable knob 118 for the purpose of manipulating such rod. In this regard, it will be noted that the frame member 18 is provided with a slotted configuration confining movements of the control rod, such slotted configuration comprising the vertically elongated horizontally spaced detent slots 120 provided at opposite ends of the longitudinally elongated slot 122.

Referring now to the operation of the control means 108 in selectively clutching one or the other end of the drive shaft 56 through a particular one of the clutch members or collars 76 to one or the other of the screw and nut assemblies 46 and 48, it will be appreciated that the control rod 110 may be disposed in a neutral position in which the knob 118 is disposed substantially midway between the detent slots 120, at which time the carriage 80 disposes the respective clutch members or collars 76, and particularly the clutch teeth 78 thereof, out of engagement with the cooperating clutch teeth 62 on the respective ends of the drive shaft 56. If it is desired to actuate the auxiliary frame 28 for movement either up or down, the control rod is manually shifted along the longitudinal slot 122 toward the foot of the bed construction and, upon the control rod abutting the rightward end of such slot within the associated detent slot 120 as viewed in FIGURES 4 and 5, the carriage 80 will have been shifted to the left in such figures of the drawing to dispose the clutch teeth of the clutch member or collar 76 on the right hand side of the carriage in firm meshing engagement with the clutch teeth associated with the adajcent end of drive shaft 56, assuming that the respective clutch teeth happen to be disposed following a previous operation in an angular position permitting their ready mating engagement in this manner. In the event that there is interference between such clutch teeth, the relative spacing between the vertical detent slot 120, the pivot connection 114 of the rod and its connection to the carriage 80 is such that the flexible rod will be bowed and stressed as indicated in dotted line in FIGURE 4 due to such interference. Thus, as the rod is held in the plane of the associated detent slot 120, the clutch teeth 78 on the clutch collar are biased toward meshing engagement with the associated teeth 62 on drive shaft 56. The control knob 118 is adapted to then be raised or lowered within the vertical detent slot 120, depending upon whether the auxiliary frame member 28 is to be raised or lowered, resulting in energization of the electric motor 50 driving the drive shaft 56 as will appear hereinafter. Initial rotation of the drive shaft under such circumstances results practically immediately in the bias of the rod 110 dropping the clutch collar 76 into full meshing engagement with the associated clutch teeth on the drive shaft and removal of the stress in the control rod resulting from clutch teeth interference. Naturally, movement of the control rod 110 to the left in FIGURES 4 and 5 toward the head portion of the bed until it engages the other end of the horizontal slot 122 may result in exactly the same action during meshing engagement of the other clutch collar or member 76 to conduct drive from the drive shaft 56 through the screw and nut assembly 46 to control raising and lowering movement of the auxiliary frame member 20. Irrespective of the direction in which the control rod is shifted, it will be readily apparent that, due to the interconnection of the clutch collars or members 76 by the carriage 80, as one selected clutch collar or member moves toward meshing engagement with the drive shaft 56, the other reciprocated away therefrom, thereby resulting in power actuation by only one or the other of the auxiliary frame members 20 and 28 at any one time.

In order to provide substantially concurrent control of energization of the aforementioned reversible electric motor 50 as the control rod 110 is shifted between its various positions as aforedescribed, a control switch mechanism of conventional construction indicated at 124 is suitably mounted on the control rod adjacent the inner face of frame member 18, and includes the conventional self-centering toggle actuating member 126. The inner face of frame member 18 is provided with two pairs of vertically spaced bracket members 128 disposed immediately adjacent the respective vertical detent slots 120 and so positioned with respect to the switch mechanism 124 that the toggle member 126 of the latter will be disposed between the brackets of any pair thereof upon movement of the control rod into the vertical plane of the associated detent slot 120. The switch mechanism is connected by suitable conductors 130 to the motor 50.

Referring now to the operation of the switch mechanism 124, and referring to disposition of the control rod 110 in the full line position of FIGURE 4 by way of example to control adjustment of the auxiliary frame 28, the control rod may then be elevated within the associated detent slot 120 or lowered therein depending upon whether or not the auxiliary frame 28 is to be raised or lowered correspondingly. Irrespective of the direction in which the control rod is so moved, the associated pair of the bracket members 128 will trip the toggle member 126 to actuate the switch to operate the motor in a corresponding direction, thereby rotating the drive shaft 56 in conducting drive to the particular screw shaft and nut assembly selected by the clutch mechanism and, in this case, the assembly 48. As aforementioned, if the clutch teeth so selected are not initially engaged upon movement of the control rod to the end of the horizontal slot 122, initial rotation of the drive shaft will accomplish this purpose under the biasing influence of the rod 110. In addition, in raising or lowering the rod within either of the vertical detent slots 120, the flexible rod is also stressed in a vertical plane about the pivot connection 114 whereby, in the event that the rod is manually released, it will automatically return to a neutral position midway between the ends of the detent slots in the plane of the horizontal slot 122 thereby de-energizing the motor. Naturally, manipulation of the control rod to the left or the dotted line position in FIGURE 4 followed by subsequent manipulation thereof vertically within the associated detent slot 120 will result in actuation of the auxiliary frame member 20 in much the same manner.

While but one form of the invention has been shown and described, other forms will now be readily apparent to those acquainted with this art. Accordingly, it is to be understood that the foregoing description is merely for the purpose of illustration, and is not intended to limit the invention which is defined by the claims which follow.

I claim:

1. A power transmission mechanism comprising a reversible electric motor, a support, a drive shaft rotatably supported by said support, means interconnecting said motor and said drive shaft for rotating said drive shaft, a first driven shaft rotatably supported by said support adjacent one end of said drive shaft and a second driven shaft rotatably supported by said support adjacent the other end of said drive shaft, a first clutch collar axially shiftable on and mounted for rotation with said first driven shaft, a second clutch collar axially shiftable on and mounted for rotation with said second driven shaft, clutch teeth on the respective ends of said drive shaft, clutch teeth on said clutch collars for engaging said clutch teeth on said drive shaft, carriage means interconnecting said clutch collars for shifting said clutch collars in unison, means operatively connected to said carriage means for selectively engaging the teeth of the respective clutch collars with the teeth on the respective ends of said drive shaft, said means being yieldable whereby, if said teeth of a clutch collar do not mesh with the teeth of the associated end of said drive shaft, said teeth will be biased into meshing engagement.

2. A power transmission mechanism comprising power actuated drive means, driven means, shiftable clutch means movable between engaged and disengaged positions to respectively connect and disconnect said drive and driven means in drive-transmitting relationship, control means comprising a pivotal control lever having one portion thereof operatively connected to said clutch means to control shifting movement of the latter between said positions thereof, and fixed detent means, another portion of said control lever being selectively engageable with said detent means to shift said clutch means to said engaged position thereof, said control lever being yieldable throughout at least a portion of its length whereby, if said clutch means is not engaged upon shifting thereof toward said engaged portion thereof, said lever is stressed between said detent means and said clutch means to bias the latter into the engaged position thereof.

3. The power transmission mechanism according to claim 2 wherein said power actuated drive means comprises reversible electric motor means, and further comprising switch means carried by said control lever and electrically connected to said motor means, and fixed switch actuating means selectively engageable with said switch means to energize said motor means in opposite directions in response to selective manipulation of said control lever in opposite directions in said detent means.

4. A power transmission mechanism comprising power actuated drive means, driven means, selectively shiftable clutch means having engaged and disengaged positions respectively connecting and disconnecting said drive and driven means in drive-transmitting relationship, control means comprising a pivotal control lever having one portion thereof operatively connected to said clutch means to control shifting movement of the latter between said positions thereof, and fixed detent means, another portion of said control lever being respectively selectively engageable with said detent means to shift said clutch means to said engaged position thereof, said lever being yieldable to bias said clutch means toward said engaged position thereof.

5. The power transmission mechanism according to claim 4 wherein said power actuated drive means comprises reversible electric motor means, and further comprising switch means carried by said control lever and electrically connected to said motor means, and fixed switch actuating means and selectively engageable with said switch means to energize said motor means in opposite directions in response to selective manipulation of said control lever in opposite directions in said detent means.

6. A power transmission mechanism comprising a fixed support, power actuated drive means mounted on said support, driven means mounted on said support, selectively shiftable clutch means having engaged and disengaged positions respectively connecting and disconnecting said drive and driven means in drive transmitting relationship, a control rod pivotally mounted intermediate its ends on said support and having one end portion thereof operatively connected to said clutch means to control shifting movement of the latter, detent means fixed relative to said support, the other end portion of said control rod being selectively engageable with said detent means to shift said clutch means toward said engaged position thereof, said rod being yieldable throughout at least a portion of its length whereby, if said clutch means is not initially engaged, said rod is stressed between said detent means and clutch means to bias the latter to said engaged position into driving engagement thereof, switch means carried by said control rod, and switch-actuating means carried by said support and selectively engageable with said switch means to energize said motor means in response to manipulation of said control rod in said detent means.

7. A power transmission mechanism comprising a fixed support, reversible electric motor means mounted on said support, a drive shaft rotatably mounted on said support and having clutch teeth at opposite ends thereof, means drivingly interconnecting said motor means and said drive shaft to rotate the latter, first and second driven shafts rotatably mounted on said support coaxially opposite the respective ends of said drive shaft, first and second clutch collars axially shiftably on and mounted for rotation with said respective driven shafts and including clutch teeth engageable with said clutch teeth on the respective ends of said drive shaft, carriage means operatively interconnecting said clutch collars for shifting movement of the latter in substantial unison, a control rod pivotally mounted intermediate its ends on said support and having one end portion thereof operatively connected to said carriage means to control shifting movement of said clutch collars, and first and second detent means fixed relative to said support, the other end portion of said control rod being respectively selectively engageable with said first and second detent means to shift said carriage means and the clutch teeth on one of said clutch collars toward engagement with the clutch teeth on one end of said drive shaft and the other clutch collar away from the other end of said drive shaft, said rod being yieldable throughout at least a portion of its length whereby, if said clutch teeth on said one of said clutch collars and said one of said drive shaft are not initially drivingly engaged, said rod is stressed between the associated detent means and carriage means to bias said clutch teeth into driving engagement upon rotation of said drive shaft.

8. The power transmission mechanism according to claim 7 further comprising switch means carried by said control rod, and switch-actuating means carried by said support and selectively engageable with said switch means to energize said motor means in opposite directions in response to selective manipulation of said control rod in opposite directions in said respective detent means.

9. A power transmission mechanism comprising a fixed support, power actuated drive means mounted on said support, driven means mounted on said support, shiftable clutch means movable between engaged and disengaged positions respectively connecting and disconnecting said drive and driven means in drive-transmitting relationship, and manually operable control means movable in two distinct planes to control selective shifting movement of said clutch means between said positions thereof and energization of said drive means.

10. The power transmission mechanism according to claim 9 wherein said control means comprises control rod means pivotally mounted on said main frame for movement in a first one of said planes and having one portion thereof operatively connected to said clutch means to control shifting movement of the latter, detent means fixed relative to said support, another portion of said control rod being selectively engageable with said detent means to shift said clutch means to said engaged position thereof and being movable in the second one of said planes within said detent means to energize said drive means.

11. The power transmission mechanism according to claim 10 wherein said control rod means is yieldable throughout at least a portion of its length whereby, if said clutch means is not engaged upon shifting thereof toward said engaged position thereof, said lever is stressed in said first plane between said detent means and said clutch means to bias the latter toward said engaged position thereof.

12. The power transmission mechanism according to claim 10 wherein said power actuated drive means comprises reversible electric motor means, and further comprising switch means carried by said control rod means and electrically connected to said motor means, and switch actuating means carried by said main frame and being selectively engageable with said switch means to energize said motor means in opposite directions in response to selective manipulation of said control lever in opposite directions in said second plane within said detent means.

13. The power transmission mechanism according to claim 12 wherein said control rod means is yieldable throughout at least a portion of its length and is yieldably stressed in response to manipulation thereof to a switch engaging position in said second plane, whereby said rod means is automatically returned to a switch disengaging position upon release thereof.

References Cited

UNITED STATES PATENTS

| | | | |
|---|---|---|---|
| 1,935,800 | 11/1933 | Kingston | 192—.02 |
| 2,146,970 | 2/1939 | McGrew | 5—67 |
| 2,317,337 | 4/1943 | Adams | 192—.02 X |
| 2,519,080 | 8/1950 | Simpson | 192—.084 |
| 2,773,374 | 12/1956 | Bilde | 192—.02 X |
| 3,089,150 | 5/1963 | Briggs et al. | 5—68 |
| 3,278,952 | 10/1966 | Holm | 5—66 X |

ROBERT C. RIORDON, *Primary Examiner.*

J. F. McKEOWN, B. S. MOWRY, *Assistant Examiners.*